MONOCULAR MICROREPRODUCTION READER

Filed Dec. 21, 1959 2 Sheets-Sheet 1

INVENTOR:
Charles D. Gelatt,
BY Bair, Freeman & Molinare
ATTORNEYS.

Nov. 20, 1962 C. D. GELATT 3,064,528

MONOCULAR MICROREPRODUCTION READER

Filed Dec. 21, 1959 2 Sheets-Sheet 2

INVENTOR:
Charles D. Gelatt,
BY Bair, Freeman & Molinare
ATTORNEYS.

United States Patent Office 3,064,528

Patented Nov. 20, 1962

3,064,528

MONOCULAR MICROREPRODUCTION READER

Charles D. Gelatt, La Crosse, Wis., assignor to Microcard Reader Corp., West Salem, Wis., a corporation of Wisconsin Filed Dec. 21, 1959, Ser. No. 860,756
8 Claims. (Cl. 88—39)

This invention relates to a microreproduction reading device and more particularly relates to a monocular microreproduction reading device wherein both the lens means and the microreproduction holding means are supported on a frame which, in turn, is supported upon the head of the person employing the reading device.

Opaque microreproductions of books and documents which are printed on cards, and which are known under the trademark "Microcard," are now well known in libraries and research institutions of this country. In some European countries, microreproductions printed on transparent film, and known as microfiches, are more popular than the opaque microreproductions. With either of these two microreproduction-type publications, in order to read the publication it must be inserted in an optical machine which illuminates the publication and projects the illuminated publication on a screen to be viewed by the reader. Heretofore, the optical reading machines that have been provided for reading such publications are relatively bulky, complex, and expensive, as, for example, the machines disclosed in U.S. Patents 2,700,917 and 2,724,988. It is believed that the expense of the reading machines has, in some measure, limited the potential use of opaque microreproduction publications, and it is believed that the provision of a simpler and more conveniently handled reading device, and one that is much less expensive than the reading machines heretofore referred to, would contribute to the increased demand and use of opaque microreproduction publications.

Accordingly, one object of this invention is to provide a microreproduction reading device which is, relative to microreproduction reading devices heretofore available, of much less expensive construction and one which may be conveniently carried about by a user of the reading device.

Another object of this invention is to provide a microreproduction reading device of extreme simplicity, wherein the entire device is supported on the head of a person reading the microreproductions in a manner much the way eyeglasses are supported on the head of a user.

Still another object of this invention is to provide a monocular microreproduction reading device which permits of satisfactory reading of opaque microreproduction publications without use of special illuminating and projection means.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which.

Figures 1, 2:
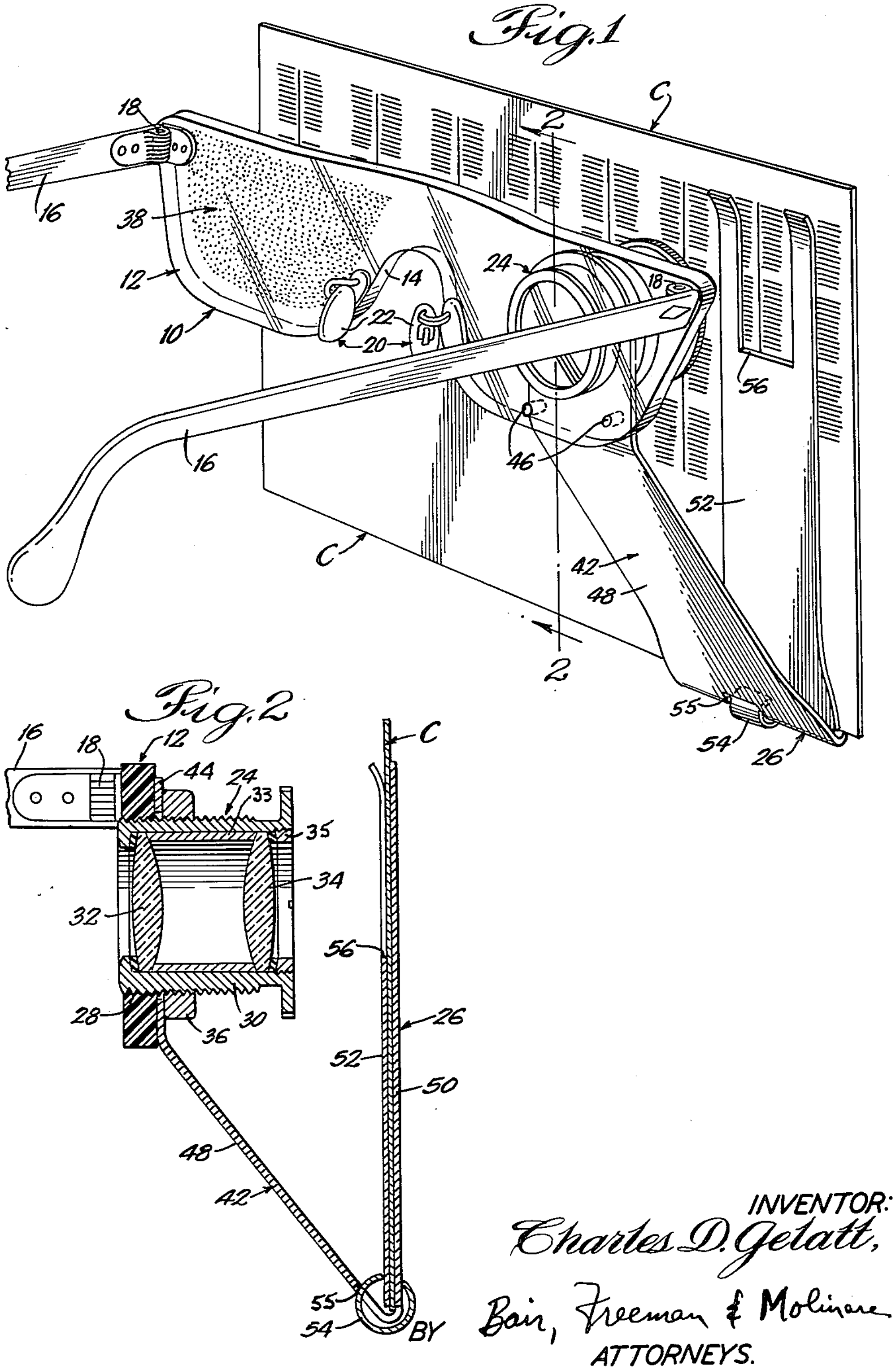
FIGURE 1 is a fragmentary perspective view of a monocular microreproduction reading device embodying the invention disclosed herein.
FIGURE 2 is a vertical cross-section view taken substantially on line 2—2 of FIGURE 1.

Referring now to the drawings, the reading device is generally indicated at 10 and includes a support frame means 12 which, in the form shown in FIGURE 1, is fashioned from a sheet of plastic material, such as acrylic, which has been cut to the shape generally indicated. The shape of the support means 12 includes a center recess 14 to accommodate the nose of a user, and it will be understood that the support frame means 12 are positioned generally transversely of the forward field of vision of both eyes of a reader.

A head-engaging means is provided connected to the support frame 12 for locating support frame 12 transversely of the forward field of vision of both eyes of the reader. Such support means include a pair of templar members 16 which are hingedly connected by hinges 18 to the frame means 12. A pair of nose-bearing members 20, including nose pads 22, also serve to partially support the frame means 12 transversely of the forward field of the vision of the eyes of the reader.

Mounted on the support frame means 12 are microreproduction-positioning-and-viewing means which are arranged to align a microreproduction-bearing publication generally indicated at C, at a position in alignment with only one eye of the reader. The microreproduction-positioning-and-viewing means include a lens means generally indicated at 24 and a microreproduction gripping and positioning structure generally indicated at 26. The frame 12 is female threaded at 28 to receive the exteriorly threaded frame means 30 for the lenses. The frame means 30 is annular and operates to position a plurality of lenses 32 and 34 in pre-selected optically spaced relation to each other, so as to provide a compound lens means which will provide the necessary magnification required to view a microreproduction with the reading device supported on the head of the reader. The spacing between lenses 32 and 34 is fixed by means of spacer 33, and the lenses are retained in frame 30 by means of retainer 35.

The lens frame 30 carries a threaded nut 36 which is adapted to be rotated to a position of abutment with parts carried by the frame 12, so as to locate a position at which the lens frame 30 is fixed relative to the frame 12. This provides a pre-selected focal position for the reading lens between the reader's eye and the microreproduction. It will be appreciated that by backing off the nut 36, the reading lens 24 may be selectively adjusted axially between the eye of the reader and microreproductions on card C, so as to provide a focal position which permits of proper viewing of the microreproductions. The relative size of the abutments 20 and templar members 16 is so selected that the positioning of the frame 12 is also related to a selected range of focal distances provided by the lens means 24, such that good viewing of a microreproduction is obtained by a single eye of the viewer through the lens means 24.

The portion of the frame 12 forwardly of the other eye of the reader is shown as being translucent rather than transparent, the purpose of this being to obstruct the vision of the viewer's other eye. Proper reading habits require that a person have both eyes open, even when viewing with but an eye through a lens means. In order to provide the proper environment for reading of microreproductions with the device of this invention, while there is provided on the frame means 12 a lens 24 through which one eye of the reader may view, the other portion of the frame means 12 is provided with the translucent part generally indicated at 38, through which light may pass but through which the viewer may not see objects. This arrangement permits the reader to keep both eyes open, while preventing one of the eyes from seeing objects which would distract the reader's attention from the microreproduction being viewed through lens means 24.

Now, the microreproduction-gripping-and-positioning means 26 includes a mounting arm 42 having a mounting portion 44 apertured to accommodate lens means 24 and adapted to be abutted against the forward face of the frame means 12 and to be held thereagainst by means of fasteners 46, such as screws or the like, which secure to the frame means 12. The mounting arm 42 also includes a downwardly and forwardly inclined portion 48 which terminates at its lower end in a plane spaced forwardly of the support frame means 12, and which merges with an elongated abutment portion 50 formed integral with mounting arm 42. The abutment 50 is positioned substantially in a plane perpendicular to the optical axis of the reading lens means 24 and is spaced forwardly of the support 12 and provides an abutment surface against which the microreproduction-bearing-publication C is placed.

There is also provided an elongated microreproduction retainer 52 which is spring-biased toward the abutment 50, so as to clamp the publication C between the retainer 52 and abutment 50. A split, cylindrical, spring member 54 is provided, having one end bearing against abutment 50 and the other end passing through recess 55 in arm 42 for engagement with the rear side of retainer 52, and provides sufficient force to obtain the necessary clamping of the publication C between the retainer 52 and abutment 50. The extended end of retainer 52 is provided with an elongated recess 56 so as to avoid obstructing the view through the lens means 24. The provision of the open-ended recess 56 also provides simple visible guide means, without use of lens 24, for locating the specific microreproduction to be read axially opposite the lens means 24.

The length of the abutment member 50 and of the retainer 52 is so selected relative to the peripheral dimensions of the publication C, which is adapted to be clamped therebetween, as to permit of the positioning of the publication C at selected positions relative to the aperture 56, so that each and every one of the microreproductions on the publication C may be positioned opposite the lens means 24, thereby permitting viewing of the entire publication C. While the microreproduction-gripping-and-positioning means 26 are shown such that the lengths of abutment 50 and retainer 52 are related to the short dimension of the publication C, to accommodate such viewing of each and every portion of the publication C, it will be appreciated that the dimensions of the parts may be varied and related to the longer dimension of the publication C for the same purposes.

Figures 3, 4, 5:
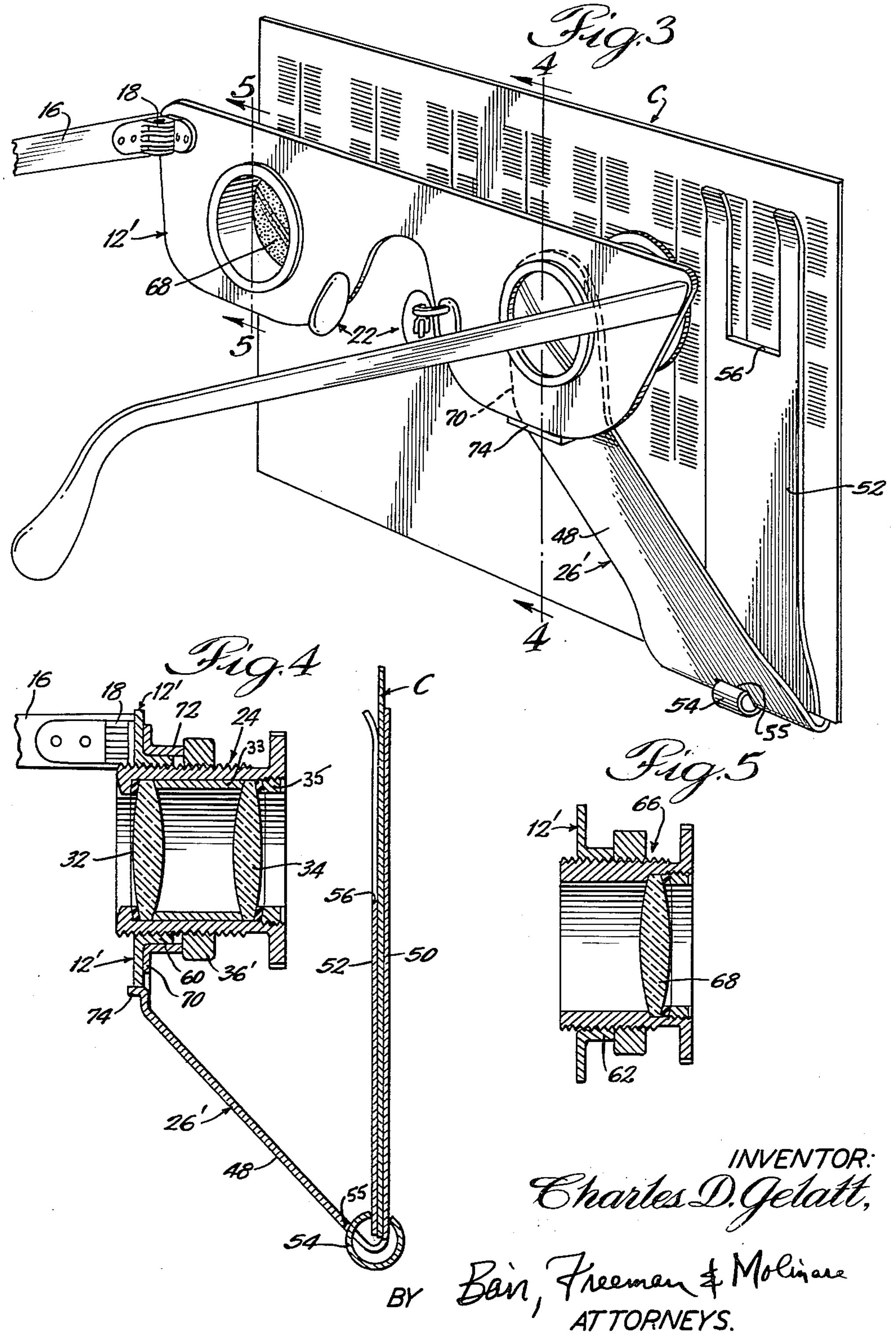
FIGURE 3 is similar to FIGURE 1 and illustrates a modified form of monocular microreproduction reader.
FIGURE 4 is a vertical cross-section view taken on line 4—4 of FIGURE 3.
FIGURE 5 is a cross-sectional view taken substantially on line 5—5 of FIGURE 3.

In the modified construction shown in FIGURES 3 to 5, elements corresponding to elements previously described are similarly numbered. Where there is some variation, the reference numeral is also provided with a prime mark. In FIGURES 3 to 5, the frame means 12′ may, for example, be constructed of metal or the like, and may be formed by a stamping operation. In FIGURE 3, each of the two main portions of frame 12′ positioned forwardly of one of the eyes of the user is provided with a threaded annular flange part 60 or 62. A lens means, generally indicated at 24, is provided for screw connection to one of the threaded flanges, such as threaded flange 60 in FIGURE 4. A second threaded frame 66, which carries an opaque or translucent, but not transparent, member 68 may be provided for screw attachment to the other threaded flange 62. This device has the advantage that if the reader desires to use the left eye for viewing, rather than the right eye, he may unscrew the frames 24 and 66 and interchange them in the threaded sockets 60 and 62. In the device shown in FIGURE 3, the reader would be using his right eye.

In order to accommodate the use of the reading device with either eye, the microreproduction-gripping-and-positioning means, generally indicated at 26′, is also removable from frame 12′, and is adapted to accompany lens 24 and be secured to the frame means 12′ in alignment with the lens means 24. For this purpose, the microreproduction gripping means 26′ includes a mounting portion 70 having an annular flange 72 adapted to telescopically cooperate with the threaded flange 60 or 62 on the frame 12′, and which is adapted to be clamped against the frame 12′ by means of nut member 36′, carried by the lens means 24. In order to prevent rotation of the microreproduction gripping means relative to the frame 12′, there is provided a flange 74, which may be struck from means 26′, which engages the under edge of the frame 12′ when the annular sleeve 72 is telescoped over the flange 60 or 62 on the frame means 12′. The latter arrangement readily permits of the transposition of the lens means 24 and the microreproduction gripping means 26′ from a right-eye viewing position to a left-eye viewing position, or vice versa.

The translucent part 38 of frame 12 in FIGURE 1 may be formed by any appropriate mechanical or chemical treatment of the material so as to produce an area that may not be clearly seen through. Alternatively, a pressure sensitive film member which inhibits clear vision therethrough may be applied to one of the surfaces of frame 12. It is also contemplated that translucent part 38, be it formed integral with frame 12 or be it a separate element, be appropriately colored in a pastel shade to the convenience and desire of the user of the reading device 10, it being understood that such a colored area 38 may inhibit eye strain. Similarly, in the device of FIGURES 3 and 5, the view-obstructing member 68 is preferably colored to the convenience and desire of the reading device user.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A microreproduction reading device comprising, in combination: support frame means adapted to be positioned transversely of the forward field of vision of a reader, head-engaging means connected to said support frame means for engaging the head of the reader so as to locate the support frame means transversely of the forward field of vision of said reader, and microreproduction-positioning-and-viewing means supported on said support frame means in alignment with only one eye of said reader, said positioning-and-viewing means including reading lens means, microreproduction gripping and positioning means spaced from said reading lens means for locating a selected microreproduction axially forwardly of the reading lens means, lens adjusting means for selectively axially adjusting the reading lens means between the eye of the reader and said microreproduction gripping and positioning means, said lens adjusting means including a screw-threaded frame for the reading lens means positioned in a screw-threaded aperture defined on said support frame means, positioning means for orienting said microreproduction-gripping-and-positioning means with respect to said support frame means, and a selectively positionable screw-threaded jam nut on said screw-threaded frame cooperating with another portion of said reading device for delineating a pre-selected focus position for the reading lens means.

2. A microreproduction reading device comprising, in combination: support frame means adapted to be positioned in a focal plane transversely of the forward field of vision of both eyes of a reader, head-engaging means connected to said support frame means for engaging the head of the reader so as to locate the support frame means transversely of the forward field of vision of both eyes of said reader, said support frame means defining a translucent portion thereof in said focal plane forwardly of one eye of the reader and a threaded aperture in the same plane spaced forwardly of the second eye of the reader, and microreproduction-positioning-and-viewing means supported on said support frame means in alignment with said second eye of said reader, said positioning-and-viewing means including reading lens means screw-threaded into said threaded aperture, microreproduction gripping and positioning means supported on said support frame means and having a part spaced from said reading lens means for locating a selected microreproduction axially forwardly of the reading lens means, and locking means for fastening said reading lens means with respect to said support frame means.

3. A microreproduction reading device comprising, in combination: support frame means adapted to be positioned transversely of the forward field of vision of both eyes of a reader, head-engaging means connected to said support frame means for engaging the head of the reader so as to locate the support frame means transversely of the forward field of vision of both eyes of said reader, microreproduction-positioning-and-viewing means supported on said support frame means in alignment with only one eye of said reader, said positioning-and-viewing means including a reading lens means, and microreproduction gripping and positioning means mounted on a first portion of said support frame means and spaced from said reading lens means for locating a selected microreproduction axially forwardly of the reading lens means, and said support frame means defining a pair of apertures each aligned with one eye of the reader, attaching means on said support frame means separate from said first portion of said support frame means and associated with each aperture, a non-transparent cover detachably connected to the attaching means adjacent one aperture to obstruct vision through said one aperture, and means connected to the attaching means for the second aperture for locating said reading lens means axially of said other aperture to permit viewing of a microreproduction therethrough.

4. A microreproduction reading device comprising, in combination: support frame means adapted to be positioned transversely of the forward field of vision of both eyes of a reader, head-engaging means connected to said support frame means for engaging the head of the reader so as to locate the support frame means transversely of the forward field of vision of both eyes of said reader, an annular flange on said support frame means, microreproduction-positioning-and-viewing means supported on said support frame means in alignment with only one eye of said reader, and microreproduction-gripping-and-positioning means having thereon sleeve means for sliding telescopic supporting cooperation with said annular flange and an abutment part for engaging a portion of said support frame means to locate said microreproduction-gripping-and-positioning means at a selected attitude relative to said support frame means.

5. A microreproduction reading device comprising, in combination: support frame means adapted to be positioned transversely of the forward field of vision of both eyes of a reader, head-engaging means connected to said support frame means for engaging the head of the reader so as to locate the support frame means transversely of the forward field of vision of both eyes of said reader, an annular flange on said support frame means, microreproduction-positioning-and-viewing means supported on said support frame means in alignment with only one eye of said reader, said microreproduction-positioning and viewing means comprising lens means adjustably mounted on said annular flange, and microreproduction-gripping-and-positioning means having a portion thereof cooperating with said annular flange to support said microreproduction-gripping-and-positioning means on said annular flange of said support frame means, and a clamp means operatively engaging both said lens means and said microreproduction-gripping-and-positioning means to lock both in their operative positions.

6. A microreproduction reading device comprising, in combination: support frame means adapted to be positioned transversely of the forward field of vision of a reader, head-engaging means connected to said support frame means for engaging the head of a reader so as to locate the support frame means transversely of the forward field of vision of said reader, and microreproduction-positioning-and-viewing means supported on said support frame means in alignment with only one eye of said reader, said microreproduction-positioning-and-viewing means including reading lens means, said support frame means having a threaded annular part, said reading lens means having threads cooperating with the threaded annular part, and microreproduction-gripping-and-positioning means spaced from said reading lens means for locating a selected microreproduction axially forwardly of the reading lens means, said microreproduction-gripping-and-positioning means including an elongated downwardly and forwardly inclined mounting arm means, one end of said mounting arm means having an opening therein for accommodating the reading lens means, and the other end of said mounting arm means terminating in a plane spaced forwardly of said support frame means, positioning means for orienting said mounting arm means with respect to said support frame means, a threaded locking ring for selectively fastening said reading lens means with respect to said support frame means and for securing said mounting arm means to said support frame means, said microreproduction-gripping-and-positioning means also including an elongated abutment member fixedly carried on said mounting arm means and positioned substantially in a plane perpendicular to the axis of said reading lens means and spaced forwardly of said support frame means and against which may be positioned a microreproduction to be read, and an elongated microreproduction retainer being spring biased toward said abutment member so as to clamp a microreproduction between said retainer and said abutment member.

7. A microreproduction reading device as in claim 6 wherein the length of said abutment member and said retainer are related to at least one dimension of a microreproduction publication which is to be read, to permit of locating each microreproduction on the publication, when positioned between the abutment member and the retainer, axially opposite the reading lens means, to permit of selective reading of the entire publication.

8. A microreproduction reading device as in claim 6 wherein said support frame means has translucent means forwardly of said other eye of the reader, thus permitting the reader to keep both eyes open while reading without undue distraction or eyestrain.

References Cited in the file of this patent

UNITED STATES PATENTS

| | | |
|---|---|---|
| 582,719 | Chenowith et al. | May 18, 1897 |
| 1,568,148 | Fiske | Jan. 5, 1926 |
| 1,742,640 | Fiske | Jan. 7, 1930 |
| 2,024,322 | Wittig | Dec. 17, 1935 |

FOREIGN PATENTS

| | | |
|---|---|---|
| 812,728 | Germany | Sept. 3, 1951 |